United States Patent [19]
Beaujard et al.

[11] Patent Number: 5,774,645
[45] Date of Patent: Jun. 30, 1998

[54] PROCESS AND DEVICE FOR IDENTIFYING FAULTS IN A COMPLEX SYSTEM

[75] Inventors: Jean-Philippe Beaujard, Toulouse; André Fernekes, Lavernose, both of France

[73] Assignee: Aerospatiale Societe Nationale Industrielle, Paris, France

[21] Appl. No.: 521,060

[22] Filed: Aug. 29, 1995

[30] Foreign Application Priority Data

Aug. 29, 1994 [FR] France .................................. 94 10363

[51] Int. Cl.$^6$ .................................................. G06F 11/00
[52] U.S. Cl. ............................ 395/183.01; 395/184.01; 395/185.01; 395/182.09
[58] Field of Search ................. 395/183.13, 183.15, 395/183.01, 185.02, 185.01, 184.01, 185.1, 182.01, 181, 182.09, 182.16, 182.15, 182.18, 182.2

[56] References Cited

U.S. PATENT DOCUMENTS

| | | | |
|---|---|---|---|
| 4,438,494 | 3/1984 | Budde et al. .......................... 364/200 |
| 4,633,467 | 12/1986 | Abel et al. ............................. 371/16 |
| 4,727,548 | 2/1988 | Dickey .................................. 371/49 |
| 5,157,667 | 10/1992 | Carusone, Jr. et al. ............. 371/29.1 |
| 5,463,768 | 10/1995 | Cuddihy et al. ................... 395/183.13 |
| 5,500,944 | 3/1996 | Yoshida ............................ 395/184.01 |
| 5,568,609 | 10/1996 | Sugiyama et al. ................ 395/183.19 |

FOREIGN PATENT DOCUMENTS

0455422 A3  11/1991  European Pat. Off. .

*Primary Examiner*—Robert W. Beausoliel, Jr.
*Assistant Examiner*—Norman M. Wright
*Attorney, Agent, or Firm*—Fisher,Christen&Sabol

[57] ABSTRACT

A process and device for identifying faults in a complex system containing a plurality of elements connected together are disclosed. The device has a centralized processing station monitoring a system of complex elements which issue fault cues, within a predetermined time, to the central processing station. The fault cues are composed of an identification indicator and an origin indicator that allow the fault cues to be grouped together on the basis of their respective indicators for making a determination as to the origin of the fault. The system aide in the diagnosis and correction of a fault in a complex system, which are involved in locating and repairing such faults.

9 Claims, 3 Drawing Sheets

CASE: COMPUTER C2 IS FAULTY, BUT ABLE TO SEND FAULT CUES.

PROCESS AND DEVICE FOR IDENTIFYING FAULTS IN A COMPLEX SYSTEM

FIELD OF THE INVENTION

The present invention relates to a process for identifying faults in a complex system and to a process for associating, in a complex system of this type, operational cues and fault cues, as well as to a device for implementing these processes.

BACKGROUND OF THE INVENTION

In the context of the present invention, a complex system is understood to be a system containing a plurality of components and computers exhibiting numerous interconnections. Additionally, in such a system, in particular for practical reasons, said components and said computers are generally connected to common power supplies, thus obviously increasing the number of these interconnections. Complex systems of this type exist in very varied sectors of activity, as for example in industry, automobiles or in aviation.

Each of said computers monitors the computers and the components to which it is connected and it is capable of issuing, on the basis of this monitoring, fault cues capable of being used by operators responsible for the maintenance of said complex system, as well as operational cues intended for the users of said system.

By reason of the numerous existing interconnections, defective operation of a component produces direct or indirect effects on other components of the system so that a single fault may be at the origin of a multitude of fault cues issued by different computers.

Similarly, a temporary or permanent shutdown of a power supply can produce, at the level of the components connected to this power supply, a plurality of effects which may be likened to faults.

This is why, by reason of the large number of cues to be processed, the maintenance of a complex system of this type is usually lengthy, difficult and very expensive.

This maintenance is generally carried out by several maintenance operators, each of whom specializes in the repair of one or more particular types of components. These maintenance operators are therefore concerned only with the components with which they are familiar and they do not have an overall view of the whole system and in particular of all the existing interconnections, and this often compels them to deal separately with fault cues whose origin is the same fault.

Additionally, in order to carry out the maintenance, these operators use specific documentation which is necessarily complex by reason of the complexity of the system, so that the documentary search which has to be carried out during maintenance is often lengthy and difficult.

Furthermore, on the one hand, this documentation is not always updated immediately as and when the system is altered and, on the other hand, it is not always available at the site at which the maintenance is carried out, which then compels the maintenance operators to interpret all the direct or indirect effects of a fault. Such interpretations often involve false diagnoses and hence useless and expensive maintenance operations.

The objective of the present invention is to remedy these drawbacks. It relates principally to a process making it possible, from a pooling of all the fault cues issued in a complex system, to identify the components which are actually faulty.

SUMMARY OF THE INVENTION

To this end, according to the invention, the process for identifying faults in a complex system containing a plurality of elements connected together is noteworthy in that:

a) said complex system is divided into a plurality of sets of elements, each of said sets being capable of issuing, upon a fault relating directly or indirectly to at least one of the elements of this set, a fault cue containing an identification indicator, designating the element which the set regards as being faulty, and an origin indicator, designating set issuing set;

b) all the fault cues issued are centralized;

c) for the fault cues issued during a predetermined period:
the fault cues for which the identification indicator of one of said fault cues corresponds to the origin indicator of another of said fault cues are grouped together, respectively in first data groups, and, for each first data group thus formed, the fault cues, not already grouped together, for which the identification indicator corresponds to the identification indicator of one of said fault cues of the group, are added thereto; and fault cues which are not grouped together in said first data groups for which the identification indicators are the same, are grouped together, respectively in second data groups, each of said first and second data groups thus formed containing fault cues having as origin the fault of one and the same element; and d) for each of said first and second data groups and for each fault cue which was not able to be grouped together with any other, the element which is actually faulty and which is at the origin of the relevant fault cues is determined, this element being:

for the fault cues which were not able to be grouped together, the element designated by the identification indicator;

for the first data groups, either the element designated by the identification indicator which, as the case may be, does not correspond to any origin indicator of the group, or, when a fault cue of the group contains an identification indicator and an origin indicator which are identical, the element designated by these identical indicators; and for the second data groups, the element designated in a common manner by the identification indicators..

Thus, by virtue of the invention, the elements which are actually faulty are determined directly, and this obviously involves a substantial time saving and hence a reduction in maintenance cost.

Additionally, by grouping together cues, carried out when searching for a faulty element, the cues resulting directly or indirectly from a specified fault are ascertained, which cues need not therefore be taken into account during maintenance.

Advantageously, said predetermined period is defined in such a way that the following considerations hold:

two fault cues separated by a time greater than said predetermined period are always independent of one another; and two fault cues separated by a time less than or equal to said predetermined period are capable of being dependent on one another, that is to say they are capable of having the same fault as origin.

As recalled earlier, in a complex system, in addition to said fault cues, operational cues are produced, that is to say cues which are related to the use of the various elements of the system, for example alarms.

Such operational cues are of course issued upon faults and they are capable, in such a case, of objectively presenting the actual situation to the user so that he can take the necessary and appropriate measures required by this situation. It is obviously important in this case to ascertain the fault which is at the origin even indirectly of these operational cues.

The present invention also relates to a process making it possible to associate with the fault cues, corresponding operational cues, said operational cues containing in the context of the present invention both an identification indicator and an origin indicator, like aforesaid fault cues.

According to the invention, said process is noteworthy in that:

a) the operational cues are centralized jointly with the fault cues; and b) for the cues issued during a predefined period, said operational cues are associated, either with the fault cues exhibiting one and the same identification indicator, or with the fault cues for which the origin indicator corresponds to the identification indicator of said operational cues.

Preferably, said predetermined period and said predefined period are identical.

Advantageously, each of said operational and fault cues additionally contains a fault evaluation indicator indicating the importance of the fault with respect to the operation of the system, and an operational cue is associated with a fault cue if, in addition to the conditions defined in step b) of the process specified previously, the respective fault evaluation indicators are identical. Such a fault evaluation indicator additionally enables the user of the system to take the measures actually befitting the existence of the corresponding fault.

For this purpose, advantageously, the fault evaluation indicator is capable of indicating two different levels of fault, one of which corresponds to a major fault, for which the system is no longer able to carry out its function and the other of which corresponds to a minor fault, for which, despite the fault, the system is still able to carry out its function.

Of course, the fault evaluation indicator may present other cues and/or it may be refined, being for example capable of indicating other levels of fault, intermediate between major fault and minor fault.

The present invention also relates to a device for implementing any one of aforesaid processes.

Advantageously, said device includes:

sets of elements comprising elementary components and at least one computer connected to said elementary components, said computer being capable of identifying an element subject directly or indirectly to a fault; and a central computer, connected to the computer of each of said sets and receiving fault cues and operational cues from said computers, said central computer grouping together said fault cues and determining from these grouped-together fault cues the elements which are actually faulty, and said central computer additionally being capable of associating operational cues with corresponding fault cues.

Of course, said computers can send the appropriate information directly to said central computer. However, advantageously, said central computer can also include a memory in which are stored the various fault cues capable of being used by said central computer, said computers being capable of sending coded signals to said central computer enabling the latter to access the appropriate stored cues.

Advantageously, said central computer furthermore includes a time base for logging all the cues received, this making it possible to pool the cues received not immediately, but later, by recording said cues for this purpose together with their logged time of reception.

BRIEF DESCRIPTION OF THE DRAWINGS

The appended drawings will clearly elucidate the manner in which the invention may be embodied.

DETAILED DESCRIPTION OF THE INVENTION

Figure 1:
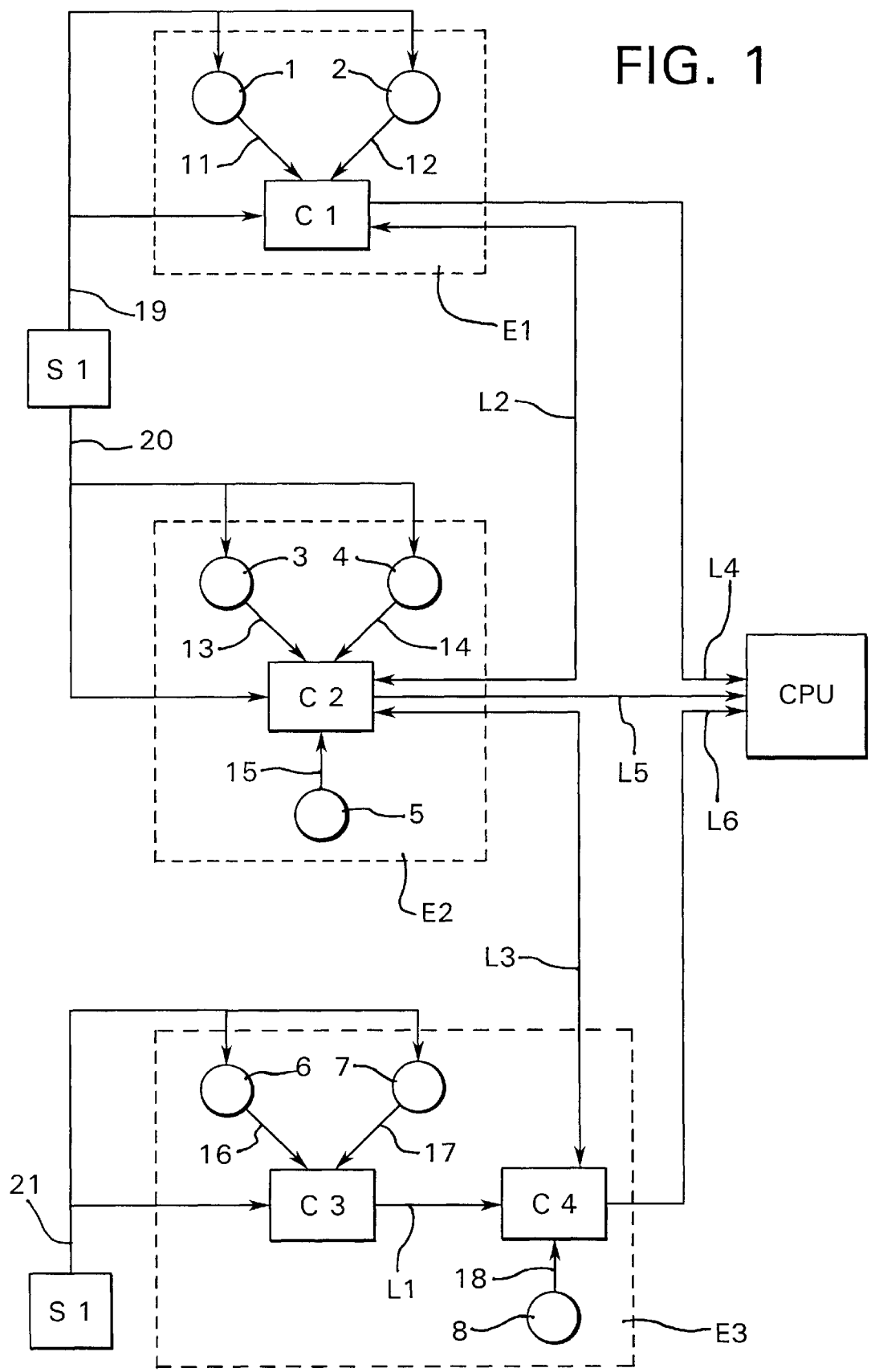
FIG.1 shows the schematic diagram of a device in accordance with the invention for identifying faults in a complex system.

The device according to the invention and represented in FIG. 1 is intended, in accordance with its main function, to identify faults in a complex system.

A complex system is understood, in the context of the present invention, as mentioned earlier, to be a system containing a plurality of elements formed of elementary components 1 to 8 and computers C1 to C4, said elements exhibiting very many interconnections which will be specified below. An elementary component is understood to be, in particular, any apparatus or element necessary for the operation of the complex system and mounted for this purpose within said complex system. As regards the complex system, it may be for example an aircraft or any other system exhibiting aforesaid characteristics.

Additionally, in a complex system of this type, said elements are for the most part supplied from power supplies S1 and S2 which are generally connected to several of said elements, this obviously increasing the number of interconnections.

By reason of these numerous interconnections, defective operation of an element produces direct or indirect actions on other elements of the system so that a single fault may be at the origin of very many direct or indirect effects, which are capable of being likened to faults.

Similarly, a temporary or permanent shutdown of a power supply can produce, at the level of the elements connected to this power supply, a plurality of effects which may themselves also be likened to faults.

The device according to the invention has the purpose of remedying these drawbacks, by making it possible to determine, on the one hand, the elements which are actually faulty and, on the other hand, the direct and indirect effects of such faults.

For this purpose, said device includes:

sets E1 to E3 consisting of elements of the complex system, as well as, if necessary, elements arranged in a specific manner for implementing the invention; and a central computer COMP connected to these sets El to E3.

Each of said sets E1 to E3, which groups together several components of the system, includes at least one computer C1 to C4, said computers being either computers existing within the system, or computers arranged in a specific manner for the implementation of the present invention.

Figure 2:
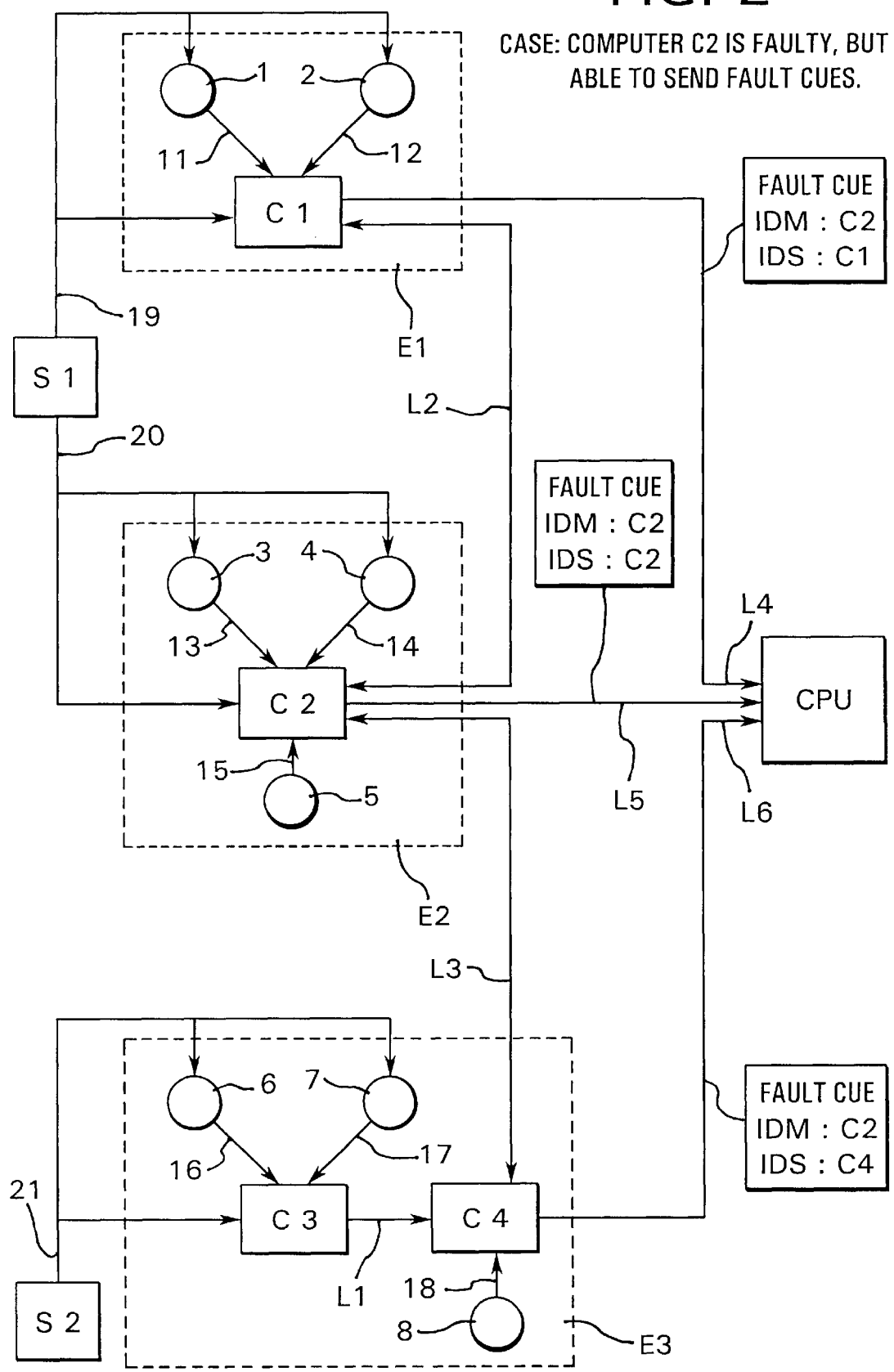
FIG. 2 shows, in an exemplary manner, fault cues moving in the system.
Figure 3:
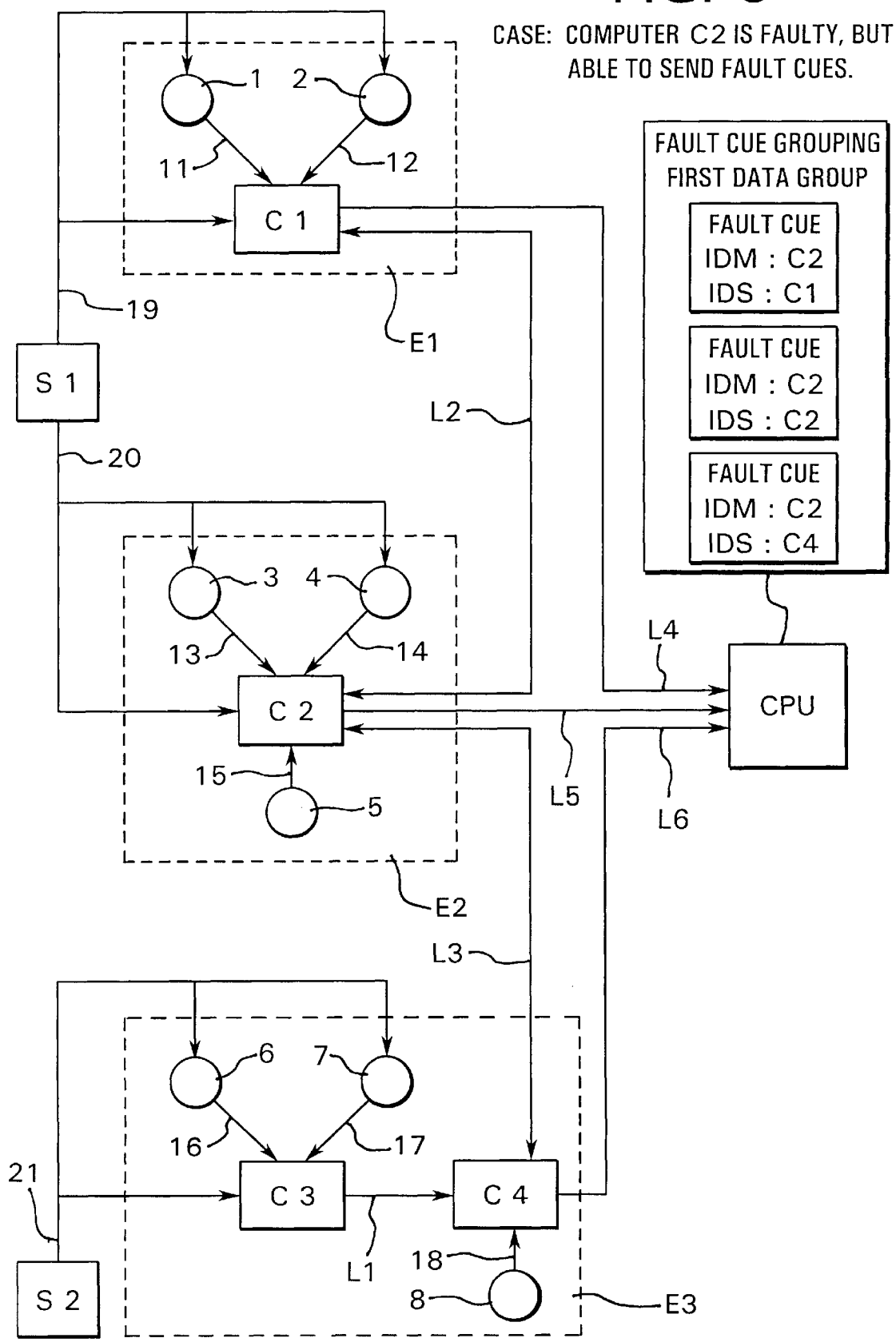
FIG. 3 shows, in an exemplary manner, fault cue groupings in the central computer.

More precisely, in the examples represented in FIGS.1,2 and 3:

the set E1 includes:

the computer C1, and the components 1 and 2 connected to said computer C1 by way of links 11 and 12 respectively;

the set E2 includes:

the computer C2, and the components 3, 4 and 5 connected to said computer C2 by way of links 13, 14 and 15 respectively, and the set E3 includes:

computers C3 and C4 connected together by way of a link L1, and the components 6 and 7 connected to said computer C3 by way of links 16 and 17 respectively and the component 8 connected to said computer C4 by way of a link 18.

Said complex system moreover includes for operation thereof, the power supplies S1 and S2. The power supply S1 is connected, on the one hand, to the elements of the set E1 by way of a link 19 divided correspondingly and, on the other hand, to the elements of the set E2, with the exception of the component 5, by way of a link 20 also divided correspondingly. The power supply S2, for its part, is connected by way of a link 21 formed in a suitable manner to the elements of the set E3, with the exception of the component 8 and of the computer C4 which is for example provided with a built-in power supply, not represented.

Said components 5 and 8 include for example for their operation, specific power supplies, not represented, or do not require any power supply for their operation.

All the components of a set E1, E2 or E3 are therefore connected to at least one computer of said set. Said computers are additionally connected together. Thus, the computer C2 is connected, on the one hand, to the computer C1 by a link L2 and, on the other hand, to the computer C4 by a link L3. Other links may of course be envisaged. However, for reasons of simplification of the drawing, attention is confined to said links L2 and L3 between the various computers.

Moreover, it will be noted, although this is not the case in the example represented, that links may be envisaged between components and computers of different sets.

Said computers C1 to C4 monitor the components and the computers to which they are connected. Additionally, at least one computer per set is connected to the central computer COMP, so as to be able to send it the cues stemming from this monitoring. In the example represented in the figure, the computers C1, C2 and C4 are connected to said central computer COMP by way of links L4, L5 and L6 respectively.

Upon a fault relating directly or indirectly to one of the elements of a set, the computer of said set connected to the central computer sends the latter a fault cue containing an identification indicator IDM designating the element which it regards as being faulty and an origin indicator IDS designating said computer which issues the fault cue.

Said computers C1, C2 and C4 of the sets E1, E2 and E3 can obviously send the appropriate information directly to the central computer COMP. However, according to a particular embodiment, said central computer COMP can include a memory, not represented, in which are stored the various fault cues capable of being used by said central computer COMP, the computers C1, C2 and C4 of the sets E1, E2 and E3 then sending coded signals to said central computer COMP enabling the latter to access the appropriate stored cues.

From the cues received, said central computer COMP determines the elements which are actually faulty.

For this purpose, said central computer COMP groups together, firstly, in respect of the cues received during a predetermined period T:

in first data groups, the fault cues for which the identification indicator of one of said fault cues corresponds to the origin indicator of another of said fault cues, adding thereto the fault cues not already grouped together and for which the identification indicator corresponds to the identification indicator of one of said fault cues of the group; and in second data groups, the fault cues not grouped together in said first data groups and for which the identification indicators are the same.

The period T is defined for example empirically, taking into account the following considerations:

two fault cues, and hence two faults, separated by a time greater than the period T are always independent of one another; and two fault cues separated by a time less than or equal to the period T are capable of being dependent on one another.

Said central computer COMP includes a built-in time base, not represented, making it possible to log the cues received and, hence, to select for their analysis those received during a period T.

Each of said first and second data groups thus formed contains fault cues having as origin the fault of one and the same element.

For each of these first and second data groups and for each fault cue which was not able to be grouped together with any other, said central computer COMP next determines the element which is actually faulty and which is at the origin of the relevant fault cues, this element being:

for the fault cues which were not able to be grouped together, the element designated by the identification indicator;

for the first data groups, either the element designated by the identification indicator which, as the case may be, does not correspond to any origin indicator of the group, or, when a fault cue of the group contains an identification indicator and an origin indicator which are identical, the element designated by these identical indicators; and for the second data groups, the element designated in a common manner by the identification indicators.

In order to clearly explain the present invention, a few examples of faults will be specified below, making it possible to illustrate various situations capable of arising in practice.

For this purpose, only the cues sent by the computers C1, C2 and C4 connected to the central computer COMP are of concern.

By way of first example and as shown in FIGS. 2 and 3, it is assumed that the computer C2 is faulty, but that it is still able to send cues. This fault directly affects the computers C1 and C4 by way of the links L2 and L3.

Said computers C1, C2 and C4 therefore send, as a consequence of this fault, fault cues formed of an identification indicator IDM and an origin indicator IDS to the central computer COMP.

In this case:

the computer C2 sends the cue
{ IDM : C2
{ IDS : C2
the computer C1 sends the cue
{ IDM : C2
{ IDS : C1

-continued

| | |
|---|---|
| and the computer C4 sends the cue | { IDM : C2<br>{ IDS : C4. |

Said cues are grouped together in a first data group since the identification indicator IDM of the cues sent by the computers C1 and C4 corresponds to the origin indicator IDS of the cue sent by the computer C2. Additionally, as the cue sent by said computer C2 contains an identification indicator IDM and an origin indicator IDS which are identical, the element designated by these identical indicators, that is to say the computer C2, is regarded according to the invention as being the faulty element, this clearly corresponding to the assumption envisaged.

By way of second example, it is assumed that the computer C2 is faulty and that it can no longer send a cue to the central computer COMP. Said fault directly affects the computers C1 and C4 which themselves can of course still send cues to said central computer COMP.

Said central computer COMP therefore receives:

| | |
|---|---|
| from C1, the cue | { IDM : C2<br>{ IDS : C1 |
| and from C4, the cue | { IDM : C2<br>{ IDS : C4 | this making it possible to determine the faulty element, that is to say the computer C2 designated in a common manner by all the identification indicators received, after grouping said cues together in second data groups.

By way of third example, it is assumed that the component 3 is faulty.

In this case, the computers C1 and C4 are indirectly affected by this fault, by way of the computer C2.

The central computer COMP therefore receives the following cues:

| | |
|---|---|
| from the computer C2 | { IDM : component 3<br>{ IDS : C2 |
| from the computer C1 | { IDM : C2<br>{ IDS : C1 |
| and from the computer C4 | { IDM : C2<br>{ IDS : C4 |

These cues are grouped together in a first data group and the faulty element is the one designated by the identification indicator IDM which does not correspond to any origin indicator IDS of the group, that is to say the component 3, this clearly corresponding to the assumption envisaged.

By way of fourth example, it is assumed that the component 1 is faulty. This fault is detected directly by the computer C1 and it affects, on the one hand, by way of said computer C1 the computer C2 and, on the other hand, by way of said computer C2 the computer C4.

So, in this case the central computer COMP receives the following cues:

| | |
|---|---|
| from the computer C1 | { IDM : component 1<br>{ IDS : C1 |
| from the computer C2 | { IDM : C1<br>{ IDS : C2 |
| and from the computer C4 | { IDM : C2<br>{ IDS : C4 |

Said cues are grouped together in a first data group and the faulty element is the one designated by the identification indicator IDM which does not correspond to any origin indicator IDS of the group, that is to say the component 1 in accordance with the assumption envisaged.

By way of fifth and final example, it is assumed that the power supply S1, or an element, not represented, connected in an identical manner, is faulty. Additionally it is assumed that the fault in the power supply S1 does not interfere with the operation of the computers C1 and C2 connected to it, said computers C1 and C2 still being sufficiently supplied with power so as to carry out their functions and be able to send cues to the central computer COMP. The fault in said power supply S1 therefore is detected directly by these computers. C1 and C2 and undirectly by the computer C4, by way of said computer C2.

In this case, the central computer COMP receives the following cues:

| | |
|---|---|
| from the computer C1 | { IDM : S1<br>{ IDS : C1 |
| from the computer C2 | { IDM : S1<br>{ IDS : C2 |
| and from the computer C4 | { IDM : C2<br>{ IDS : C4 |

The fault cues from the computers C2 and C4 are firstly grouped together in a first data group since the identification indicator IDM of the computer C4 corresponds to the origin indicator IDS of the computer C2. Then, to the group thus formed is added the fault cue from the computer C1 since its identification indicator IDM corresponds to the identification indicator IDM of the computer C2. The faulty element in this example is the one designated by the identification indicator IDM which does not correspond to any origin indicator IDS of the group, that is to say the power supply S1, in accordance with the initial assumption.

It should be pointed out that it may happen that a fault cue issued cannot be associated with other fault cues, for example when the fault affects an isolated computer, not represented, connected solely to the central computer COMP. In this case, the faulty element is of course the element designated by the identification indicator of said fault cue issued, as mentioned earlier.

The device according to the invention additionally makes it possible to associate with said fault cues, and hence also with the faulty element determined in the manner described earlier, operational cues. In accordance with the invention, upon a fault, operational cues, that is to say cues which are related to the use of various elements of the system, for example alarms, are also sent from the central computer COMP.

According to the invention, the operational cues include, like the fault cues, an identification indicator and an origin indicator.

Said central computer COMP centralizes said operational cues jointly with the fault cues and, for the cues issued during a predefined period T', said central computer COMP associates said operational cues, either with the fault cues exhibiting one and the same identification indicator, or with the fault cues for which the origin indicator corresponds to the identification indicator of said operational cues.

Of course, said predefined period T' can differ from aforesaid period T used when grouping together fault cues. However, particularly for reasons of similarity of the conditions of implementation of the two processes according to the invention, in certain cases identical periods T and T' may be used.

With an aim of enhancement, each of said operational and fault cues can additionally contain a fault evaluation indicator indicating the importance of the fault with respect to the operation of the system. The central computer COMP then associates an operational cue with a fault cue if, in addition to aforesaid conditions, the respective fault evaluation indicators are identical.

Such fault evaluation indicators additionally enable the user of the system to take the measures actually befitting the existing situation, said fault evaluation indicators being in effect capable of indicating for example whether, subsequent to the fault, the system is still able to carry out its function.

The device according to the invention and described above by way of example therefore affords considerable aid to the maintenance of the complex system with which it is associated, in particular by reducing the period and cost of said maintenance.

What is claimed is:

1. A process for identifying faults in a complex system containing a plurality of elements connected together, a process according to which:
   a) said complex system is divided into a plurality of sets of elements, each of said sets being capable of issuing, upon a fault relating directly or indirectly to at least one of the elements of this set, a fault cue;
   b) all the fault cues issued are centralized;
   c) the fault cues issued during a predetermined period and which relate to one and the same faulty element are grouped together; and
   d) for each of said groupings carried out, the element which is actually faulty and which is at the origin of the relevant fault cues is determined, wherein:
   a fault cue includes an identification indicator, designating the element which the set regards as being faulty, and an origin indicator designating said issuing set;

in step c):
   the fault cues for which the identification indicator of one of said fault cues corresponds to the origin indicator of another of said fault cues are grouped together, respectively in first data groups, and, for each first data group thus formed, the fault cues, not already grouped together, for which the identification indicator corresponds to the identification indicator of one of said fault cues of the group, is added thereto; and
   fault cues which are not grouped together in said first data groups for which the identification indicators are the same, are grouped together, respectively in second data groups, each of said first and second data groups thus formed containing fault cues having as origin the fault of one and the same element; and in step d), the element which is actually faulty is:
   for the fault cues which were not able to be grouped together, the element designated by the identification indicator;
   for the first data groups, either the element designated by the identification indicator which, as the case may be, does not correspond to any origin indicator of the group, or, when a fault cue of the group contains an identification indicator and an origin indicator which are identical, the element designated by these identical indicators; and
   for the second data groups, the element designated in a common manner by the identification indicators.

2. The process as claimed in claim 1, wherein said predetermined period is defined in such a way that the following considerations hold:
   two fault cues separated by a time greater than said predetermined period are always independent of one another; and
   two fault cues separated by a time less than or equal to said predetermined period are capable of being dependent on one another.

3. A process for associating with the fault cues, used in the process specified under claim 1 for identifying faults, corresponding operational cues capable of being issued by said sets of elements of the complex system, said operational cues containing like the fault cues an identification indicator and an origin indicator, wherein:
   a) the operational cues are centralized jointly with the fault cues; and
   b) for the cues issued during a predefined period, said operational cues are associated, either with the fault cues exhibiting one and the same identification indicator, or with the fault cues for which the origin indicator corresponds to the identification indicator of said operational cues.

4. The process as claimed in claim 3, wherein said predetermined period and said predefined period are identical.

5. The process as claimed in claim 3, wherein each of said operational and fault cues additionally contains a fault evaluation indicator indicating the importance of the fault with respect to the operation of the system, and wherein an operational cue is associated with a fault cue if, in addition to the conditions defined in step b) of the process specified under claim 3, the respective fault evaluation indicators are identical.

6. The process as claimed in claim 5, wherein the fault evaluation indicator is capable of indicating two different levels of fault, one of which corresponds to a major fault, for which the system is no longer able to carry out its function and the other of which corresponds to a minor fault, for which, despite the fault, the system is still able to carry out its function.

7. A device for implementing the process specified under claim 1, wherein it includes:
   sets of elements (E1, E2, E3) comprising elementary components (1 to 8) and at least one computer (C1, C2, C3, C4) connected to said elementary components, said computer being capable of identifying an element subject directly or indirectly to a fault; and
   a central computer (COMP), connected to the computer (C1, C2, C4) of each of said sets (E1, E2, E3) and receiving fault cues and possibly operational cues from said computers, said central computer (COMP) grouping together said fault cues and determining from these grouped-together fault cues the elements which are actually faulty, and said central computer (COMP) additionally being capable as the case may be of associating operational cues with corresponding fault cues.

8. The device as claimed in claim 7, wherein said central computer (COMP) includes a memory in which are stored the various fault cues capable of being used by said central computer, said computers (C1, C2, C4) being capable of sending coded signals to said central computer (COMP) enabling the latter to access the appropriate stored cues.

9. The device as claimed in claim 7, wherein said central computer (COMP) includes a time base for logging all the cues received.

* * * * *